(12) United States Patent
Kempf et al.

(10) Patent No.: US 10,113,686 B2
(45) Date of Patent: Oct. 30, 2018

(54) HEIGHT-ADJUSTABLE FOOT ARRANGEMENT

(71) Applicant: Mettler-Toledo (Albstadt) GmbH, Albstadt (DE)

(72) Inventors: Edgar Kempf, Inzigkofen (DE); Xinwei Su, Jiangsu (CN); Dieter Kontschak, Winterlingen (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 86 days.

(21) Appl. No.: 14/862,890

(22) Filed: Sep. 23, 2015

(65) Prior Publication Data

US 2016/0084430 A1   Mar. 24, 2016

(30) Foreign Application Priority Data

Sep. 24, 2014 (EP) .................................. 14186070

(51) Int. Cl.
| | |
|---|---|
| *F16M 11/24* | (2006.01) |
| *G01D 11/24* | (2006.01) |
| *G01G 21/23* | (2006.01) |
| *G01G 23/00* | (2006.01) |

(52) U.S. Cl.
CPC .......... *F16M 11/24* (2013.01); *G01D 11/245* (2013.01); *G01G 21/23* (2013.01); *G01G 23/002* (2013.01)

(58) Field of Classification Search
CPC ......... G01D 11/24; F16M 11/24; G01G 21/23
See application file for complete search history.

(56) References Cited

U.S. PATENT DOCUMENTS

| | | | | |
|---|---|---|---|---|
| 4,219,089 A | | 8/1980 | Gard et al. | |
| 4,461,551 A | * | 7/1984 | Blaha | A61B 3/117 351/214 |
| 5,332,182 A | * | 7/1994 | Weisz | G01G 23/002 248/188.4 |
| 6,407,351 B1 | * | 6/2002 | Meyer | G01G 7/06 177/210 C |
| 7,287,732 B2 | * | 10/2007 | Balistreri | A47B 91/024 16/32 |

(Continued)

FOREIGN PATENT DOCUMENTS

| | | | | |
|---|---|---|---|---|
| EP | 3001159 A1 | * | 3/2016 | ............. G01G 21/23 |
| JP | 2009-25256 A | | 2/2009 | |

(Continued)

*Primary Examiner* — Lisa Caputo
*Assistant Examiner* — Jamel Williams
(74) *Attorney, Agent, or Firm* — Standley Law Group LLP

(57) ABSTRACT

To adapt a housing (2) to an uneven standing surface, an adjustment device (1) has a foot piece (3) with an internal thread (5) that defines a displacement axis (4). The foot piece is located in a recess (6) of the housing that is accessed from a surface of the housing that faces towards the standing surface. A cross-sectional profile of the foot piece perpendicular to the displacement axis coacts with the recess to prevent rotation of the foot piece about the displacement axis. A spindle (7) with an external thread (8) that cooperates with the internal thread of the foot piece allows axial movement of the spindle along the displacement axis. A levelling wheel (9), connected to the spindle by a rotation-blocking connection allows the spindle to be rotated relative to the foot piece.

17 Claims, 4 Drawing Sheets

(56) References Cited

U.S. PATENT DOCUMENTS

| | | | | |
|---|---|---|---|---|
| 9,416,483 B1* | 8/2016 | Freakes | ................ | D06F 39/125 |
| 2013/0048818 A1* | 2/2013 | Von Pechmann | ...... | F16M 11/40 |
| | | | | 248/276.1 |
| 2014/0049376 A1* | 2/2014 | Ng | ........................ | A47B 91/00 |
| | | | | 340/10.1 |
| 2015/0323128 A1* | 11/2015 | Garvey | ................ | B65D 25/24 |
| | | | | 248/200.1 |
| 2016/0305798 A1* | 10/2016 | Breunig | ................ | G01L 19/003 |

FOREIGN PATENT DOCUMENTS

| | | | | |
|---|---|---|---|---|
| JP | 2011-242220 A | | 12/2011 | |
| JP | 2011242220 A | * | 12/2011 | |
| WO | 2009/056935 A1 | | 5/2009 | |
| WO | WO 2009056935 A1 | * | 5/2009 | ........... A47B 91/028 |

* cited by examiner

HEIGHT-ADJUSTABLE FOOT ARRANGEMENT

CROSS-REFERENCE TO RELATED APPLICATIONS

This application is entitled to benefit of a right of priority from European application 14186070.0, filed on 24 Sep. 2014, which is incorporated by reference as if fully recited herein.

TECHNICAL FIELD

The invention concerns an adjustment device to adapt a housing to uneven support surfaces.

BACKGROUND

Many instruments, in particular balances, automatic titrators, automatic moisture analyzers and the like have to be set up in a horizontal position in order to function properly. In the case of balances, the horizontal position is necessary to prevent the weighing object on the balance from sliding off, to ensure that the weight force is directed perpendicular to the weighing 00pan, and to thereby achieve a more accurate weighing result.

In many cases, the instrument is equipped for this purpose with a plurality of adjustable feet, whereby the distance from the support surface to the underside of the instrument can be changed for the purpose of levelling the instrument.

In order to adjust this distance for example in accordance with U.S. Pat. No. 4,219,089 A or U.S. Pat. No. 6,407,351 B1, the adjustable foot has to be relieved of the weight of the instrument, which means that the instrument has to be lifted slightly off the support surface. This is so because the adjustable foot is configured as a screw that has to be turned into or out of the instrument against the increased resistance that is caused by friction if the foot is in contact with the standing surface. As a result, the levelling of the instrument becomes more difficult, as this procedure is inaccurate and hard to reproduce.

This problem is addressed for example in U.S. Pat. No. 5,332,182 A, which discloses an adjustment device that allows the height to be adjusted from outside the balance housing. By turning a knurled nut, a spindle is moved in the direction of the axis of rotation. A plate prevents the spindle from turning along with the knurled nut and in addition clamps the knurled nut between itself and the housing. The spindle is constrained against rotation by a flattened portion of its circumference and by a passage opening in the plate whose contour matches the cross-section of the spindle. A drawback of this arrangement is the amount of space needed, which is determined by the fully retracted spindle and its adjustable length.

The adjustment device of U.S. Pat. No. 5,332,182 A is easy to operate. The knurled nut protrudes over about a fourth of its circumference to the outside through a slot in the balance housing. Thus the height-adjustment device can be arranged in the interior of the balance housing while the adjustment can be performed from the outside. This is on the one hand a desirable trait, but on the other hand the adjustment device is not secured against inadvertent changes of the adjustment setting. However, in certain situations there may be a need to secure the adjustment device or to protect its setting against being inadvertently changed, as could happen for example in a quick manual cleaning around the balance with a dust rag.

A further disadvantage of the adjustment device of U.S. Pat. No. 5,332,182 A becomes evident when the device is examined with a view to sanitary standards. For example, open screw threads are not acceptable, as the threads may fill up with deposits which can breed germs. In addition, under a so-called "wash-down" standard, a surface radius of at least 3 mm is required. The "wash-down" standard applies to equipment which is suitable to withstand industrial cleaning by spraying with water and/or cleaning agents as well as mixtures thereof.

The objective of the present invention is to provide an adjustment device for a housing, specifically a balance housing, which overcomes the drawbacks of the prior art. Accordingly, the adjustment device should be of a configuration which can be realized within a limited height, which is easy to operate, and which is protected against inadvertent changes of the adjustment setting.

SUMMARY

This task is solved by an adjustment device for a housing to adapt the latter to an uneven standing surface, wherein the adjustment device includes a foot piece with an internal thread forming a displacement axis. The foot piece is arranged in a recess of the housing which is accessible from the surface of the housing that faces towards the standing surface. Furthermore, the foot piece has a cross-sectional profile perpendicular to the displacement axis which in cooperation with the recess prevents a rotation of the foot piece about the displacement axis. The adjustment device further includes a spindle with an external thread that cooperates with the internal thread of the foot piece, and a levelling wheel connected to the spindle. The levelling wheel and the spindle are joined through a rotation-blocking connection.

As a result of the foot piece being arranged in a recess of the housing, a low height of the housing is achieved.

In a preferred embodiment, a stop is formed on the spindle between the external thread (8) and the spindle end that connects to the levelling wheel, while a counter-stop is formed on the housing, so that the counter-stop can be interposed or held captive between the stop and the levelling wheel. As a result of this arrangement, the spindle and the levelling wheel stay in place, i.e. they cannot move in the direction of the displacement axis, which is another favorable factor for a design of limited height.

According to a further concept of the invention which is followed in the design of the adjustment device, the degree of freedom of the spindle is limited to a rotation about the displacement axis. In other words, the spindle cannot perform a translatory movement along the displacement axis. This allows a compact design, since the adjustment device in the fully retracted position occupies no more space inside the housing than in the fully extended position. Or in other words, the adjustment device occupies a constant volume in the housing even at the ends of the adjustment range.

In a further developed embodiment of the invention, the housing is supported by the counter-stop resting on the stop of the spindle.

According to an advantageous further development of the invention, the housing rests on the supporting surface through at least three spindles.

In a further development of the invention, the rotation of the foot piece about the displacement axis is prevented by means of a form fit between the foot piece and the recess.

In an embodiment of the invention, the levelling wheel is releasably connected to the spindle by means of a snap connection. With the releasable snap connection, the adjustment device can easily be installed in, or removed from, the housing.

In a special further development of this embodiment, the snap connection works in the sense of a form-fitting connection.

In another special development of the foregoing embodiment, the snap connection works in the sense of a bayonet connection.

In a preferred embodiment, the foot piece can be accommodated entirely in the recess of the housing. In other words, the foot piece can in essence be completely integrated in the recess of the housing.

According to a further embodiment of the invention, turning the levelling wheel about the displacement axis causes the foot piece to move along the displacement axis either out of the recess or back into the recess.

According to a further concept of the invention which is followed in an embodiment of the adjustment device, the housing has a top which completely covers the levelling wheel.

In a special further development of an embodiment of the invention, the levelling wheel and the spindle are rotationally locked together with a flat portion on the circumference of a connector peg between the levelling wheel and the spindle.

In a preferred embodiment, a sole of a material different from the foot piece is attached to the surface of the foot piece that faces towards the support surface.

According to a further development of the invention, at least one stop element is attached to the surface of the foot piece that faces towards the stop on the spindle.

BRIEF DESCRIPTION OF THE DRAWINGS

In the following, the invention is described through examples that are schematically illustrated in the drawings, wherein.

DETAILED DESCRIPTION

Figure 1:
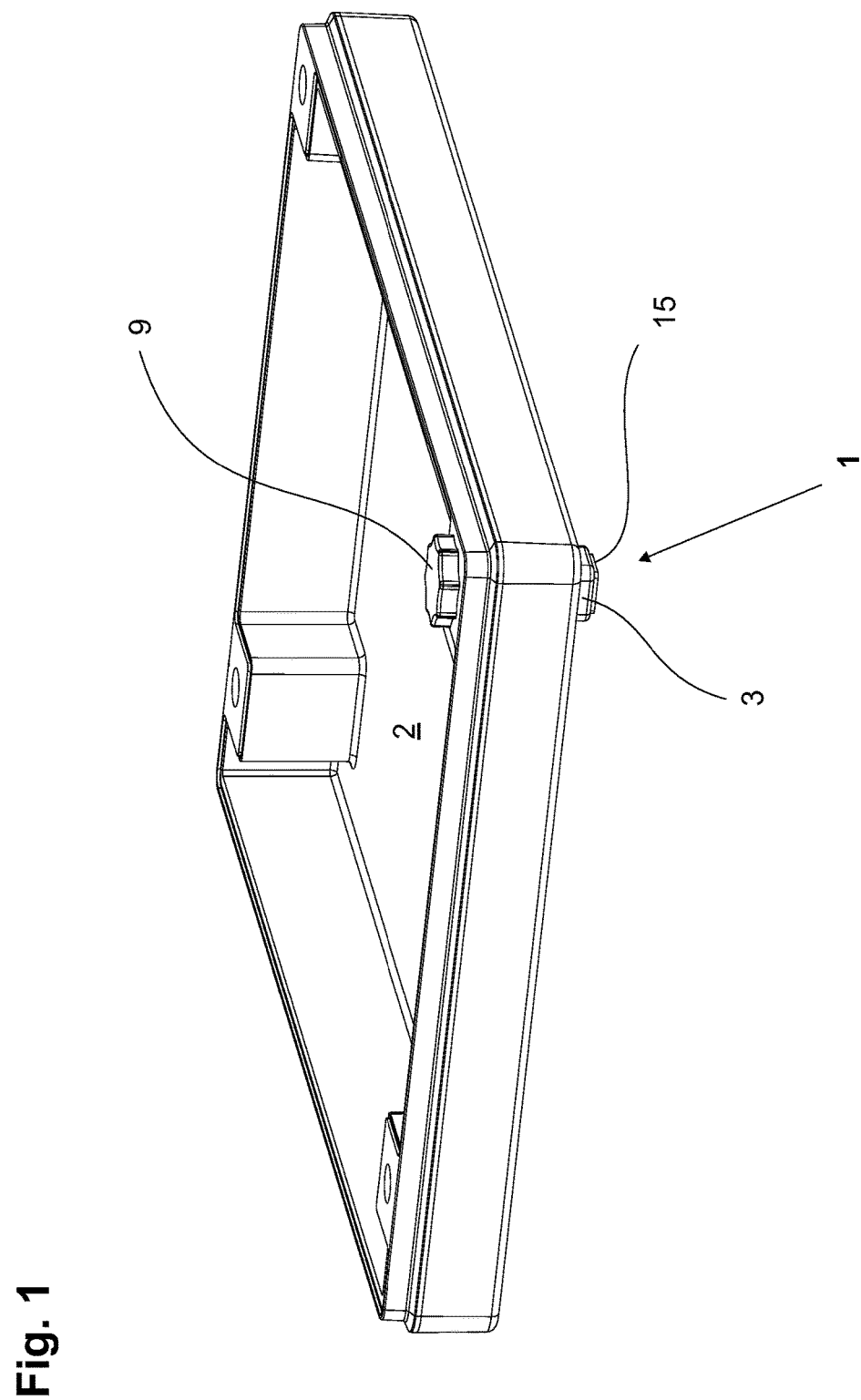
FIG. 1 represents a three-dimensional view of a housing with four positions for an adjustment device.

The housing 2 which is shown in a perspective view in FIG. 1 has four mounting places for an adjustment device 1 located, respectively, at the four corners. Only the corner closest to the viewer has an adjustment device 1 installed. The foot piece 3, which has a sole 15 as a contact layer against a supporting surface, can be seen protruding from the bottom of the housing 2. The sole 15 can be made for example of a synthetic elastomeric material with the purpose of, e.g., improving adhesion to the supporting surface or attenuating ground vibrations. A levelling wheel 9 can be seen at the top end. The position of the protruding foot piece 3 is adjustable by turning the levelling wheel 9.

Figure 2:
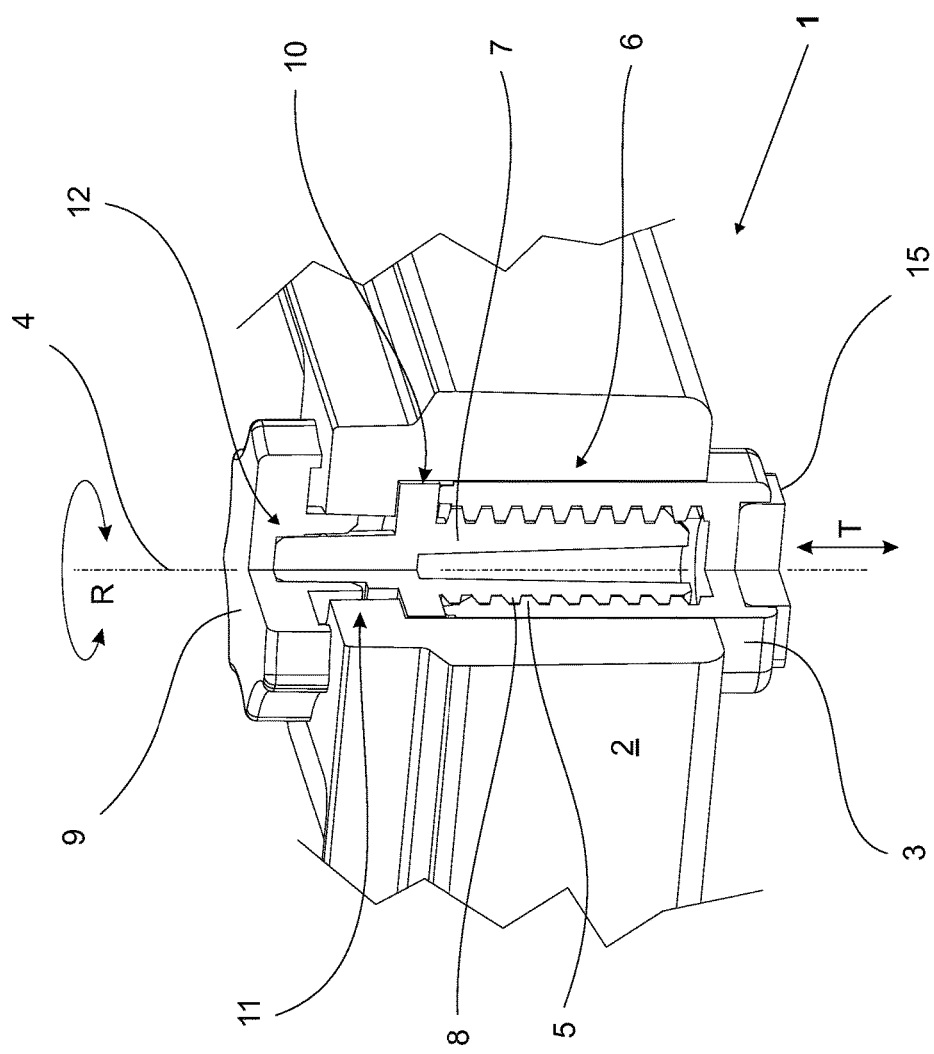
FIG. 2 represents a three-dimensional cutaway view of an adjustment device.

The three-dimensional cutaway representation in FIG. 2 allows an open view of the entire adjustment device. The foot piece 3 is arranged in a recess 6 of the housing 2, wherein the cross-sectional profile of the recess 6 matches the cross-section of the foot piece 3. The form fit between the recess and the foot piece prevents a rotation R of the foot piece 3 about the displacement axis 4 while allowing only a translatory displacement T along the displacement axis 4.

The spindle 7, which is not visible in FIG. 1, can be seen in the cutaway area of FIG. 2. At one end, the spindle 7 carries an external thread 8 which cooperates with the internal thread of the foot piece 3, while the other end of the spindle 7 is connected to the levelling wheel 9. An intermediate section of the spindle 7 has a larger diameter than the threaded section 8. The shoulder of the intermediate section 10 that faces towards the levelling wheel 9 serves as a stop 10 against the counter-stop 11 of the housing 2.

Due to the connection of the levelling wheel 9 with the spindle 7 and the counter-stop 11 interposed between them, the spindle is prevented from a translatory movement T along the displacement axis 4, except for a necessary amount of mechanical play. This means that a translatory movement T along the displacement axis 4 is not possible for the spindle 7. The freedom of movement of the spindle 7 as well as of the levelling wheel 9 is limited to a rotation R about the displacement axis 4. This allows a design with a limited height, since the adjustment device 1 in the fully retracted position occupies no more space inside the housing 2 than in the fully extended position. Or in other words, the adjustment device 1 takes up a constant volume in the housing 2 even at the ends of the adjustment range.

FIG. 2 illustrates the connection between the spindle 7 and the levelling wheel 9 as a snap connection 12 in the sense of a releasable form-fitting connection. This connection is more clearly evident in FIG. 3 and will therefore be described in a later context.

As the levelling wheel 9 is turned about the displacement axis 4, the spindle 7 participates in the rotation due to the form-fitting connection and causes a translatory displacement T of the foot piece 3 along the displacement axis 4. Thus, the housing 2 can be levelled horizontally on an uneven supporting surface by turning the appropriate levelling wheels 9 of the adjustment devices that are arranged at the corners.

As is commonly known, a full turn of the levelling wheel 9 causes a height change equal to the pitch of the screw thread. As the screw pitch is a design choice, the adjustment precision is selectable, with a smaller screw pitch allowing a finer adjustment.

Figure 3:
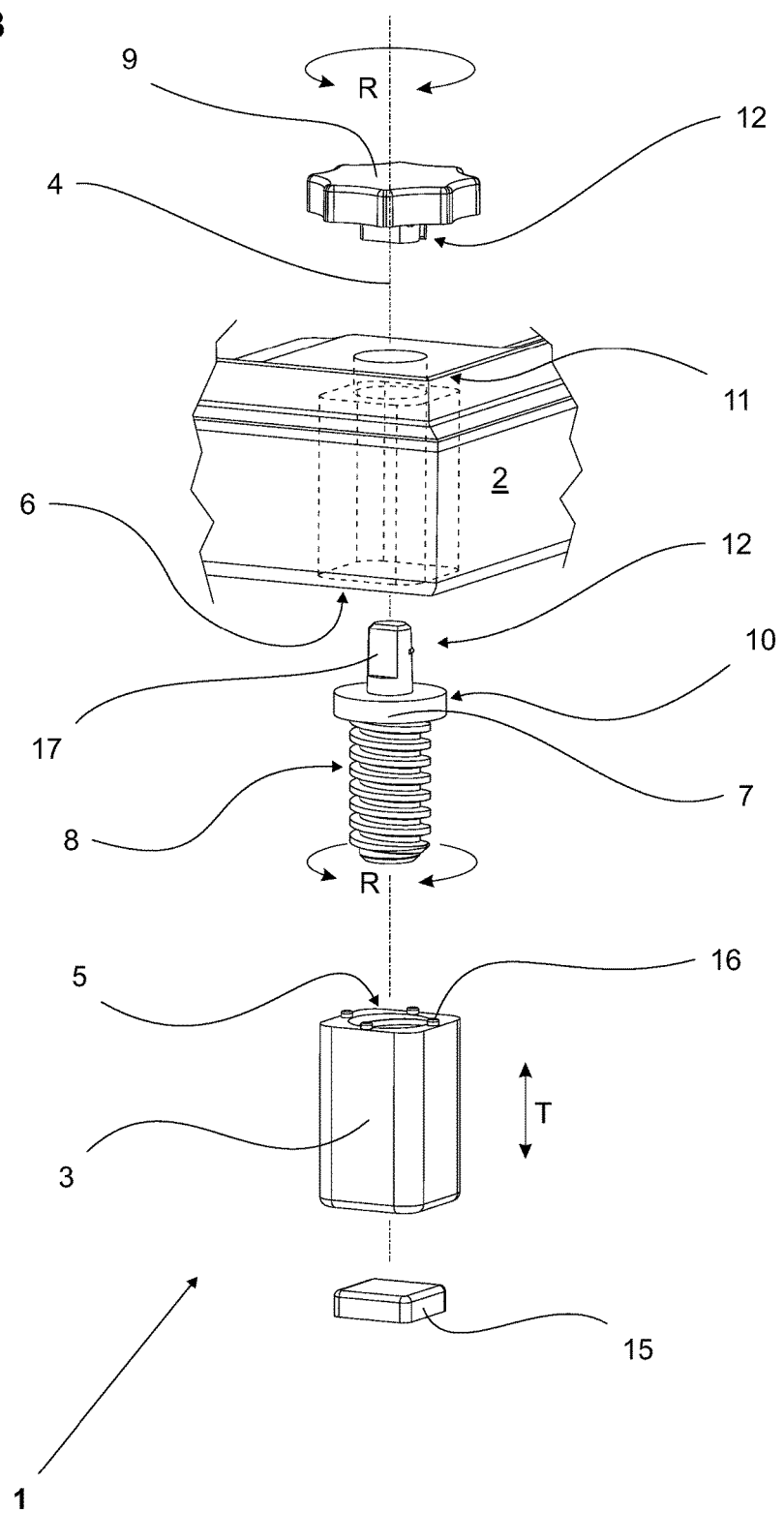
FIG. 3 represents a three-dimensional exploded view of an adjustment device.

FIG. 3 shows the same adjustment device 1 in an exploded view, wherein the spindle 7 as well as the recess 6 can be seen more clearly. Also shown in this drawing are four stop contact elements 16 which are arranged on the end surface of the foot piece 3 that faces towards the spindle 7. The purpose of the stop contact elements 16 is, among other factors, to prevent the foot piece 3 from seizing up. The stop contact elements 16 can be of the same material as the foot piece 3 and can be solidly attached, or they can be part of the same body as the foot piece 3. It would also be conceivable to use stop contact elements 16 of a synthetic elastomer, so that they could also perform a damping function.

Clearly recognizable is the shape of the recess 6 which matches the outside contour of the foot piece 3. It should be noted here that the outside contour could be of any conceivable shape, as long as the recess 6 can be formed in a corresponding shape and as long as it meets the condition that it prevents the foot piece 3 from turning about the displacement axis 4.

As already mentioned above, the connection between the spindle 7 and the levelling wheel is shown in the drawing as a snap connection 12 in the sense of a releasable form-fitting connection. The spindle in the illustrated embodiment has a conically shaped circumference with a small protuberance which provides a form-fitting connection to the levelling wheel. In the assembly process of the adjustment device 1 the spindle 7 is inserted into the recess 6, and the levelling wheel is pushed from the opposite side of the counter-stop 11 onto the conical peg of the spindle 7. The levelling wheel 9 has a small groove—matching the size of the protuberance—inside the spindle seat, where the spindle can 7 can snap into engagement.

There are also other conceivable ways in which a releasable snap connection could be realized, and the same can be said for a bayonet connection. A bayonet connection is a coupling which allows a quick connection as well as release between two cylindrical parts in the direction of their longitudinal axis. The parts are joined together by plugging one into the other and twisting them relative to each other, using the reverse sequence to separate them from each other. In conventional bayonet connections between two elements, one element usually has a bayonet pin which is entered into an appropriately shaped slot or groove of the other element in the manner of a sliding guide mechanism and moved until the bayonet pin has reached an end position corresponding to the connected state of the two elements.

A flattened area 17 on the connector peg of the spindle 7 ensures that the spindle 7 and the levelling wheel 9 cannot turn relative to each other. In other words, they are joined by a rotation-blocking connection.

FIG. 4 again represents the same housing 2 with two adjustment devices 1 in a three-dimensional view. In addition, a top 14 is shown which covers the housing 2 from above. In this assembled state, the levelling wheel 9 is neither visible nor operable. In this straightforward manner, the adjustment device 1 is not only protected against inadvertent changes of the adjustment settings, but also quickly made accessible again by simply removing the top 14 from the housing 2.

Figure 4:
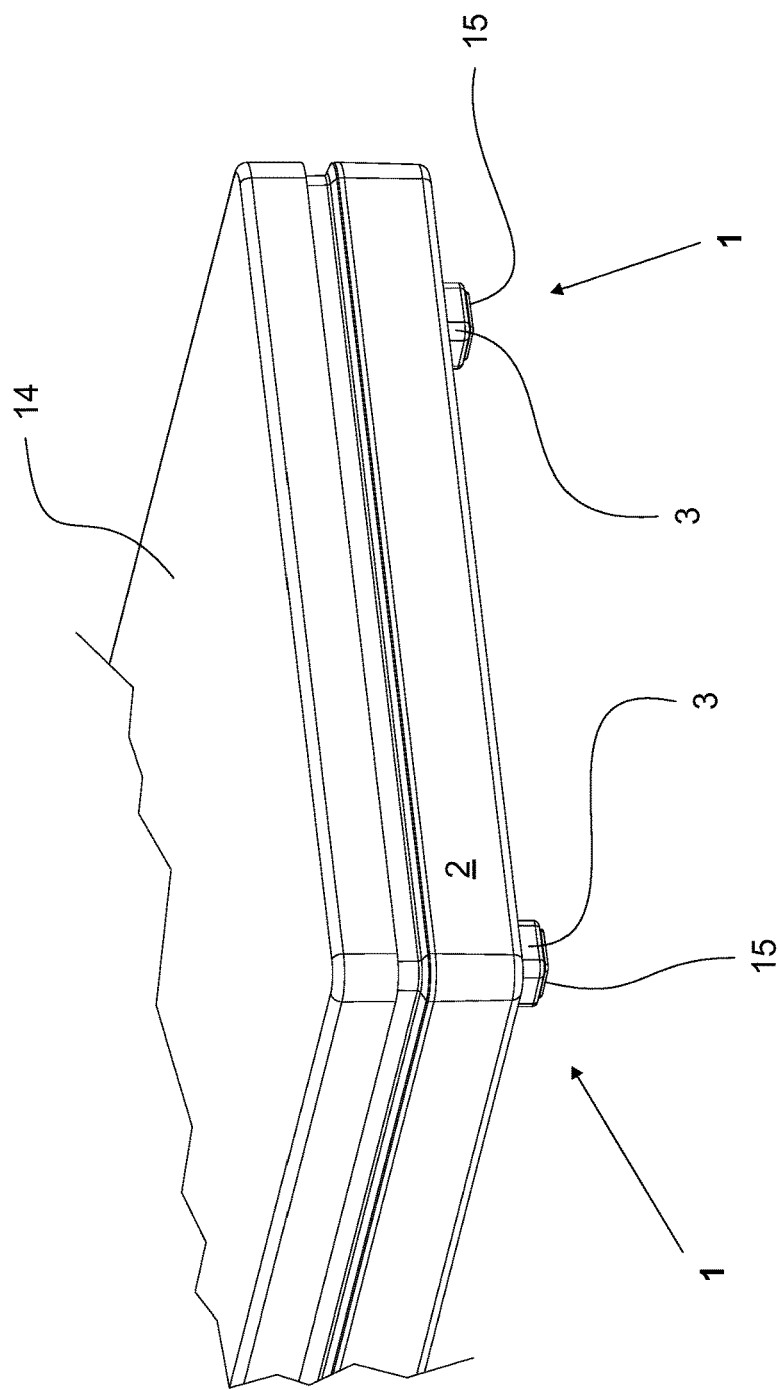
FIG. 4 represents a three-dimensional view of a housing with a top.

FIG. 4 further illustrates the important advantage that the adjustment device 1 allows the housing to have an extremely low profile which is only slightly taller than the height of the adjustment device 1 itself in its fully retracted state.

Although the invention has been described by presenting an example of a specific embodiment, it is considered evident that numerous further variants could be created based on the teachings of the present invention, for example by combining features of the individual embodiments with each other and/or by interchanging individual functional units between the embodiments.

What is claimed is:

1. A device for adjusting a relationship of a housing to a surface on which the housing stands, while protecting against inadvertent changes of an adjustment setting, the device comprising:
    a foot piece, arranged in a recess on a surface of the housing that faces the surface on which the housing stands, the foot piece having an internal thread that defines a displacement axis, the foot piece further having a cross-sectional profile, perpendicular to the displacement axis, that coacts with the recess to prevent rotation of the foot piece about the displacement axis;
    a spindle with an external thread that cooperates with the internal thread of the foot piece;
    a levelling wheel;
    a snap connection that releasably connects the levelling wheel to an end of the spindle, limiting the spindle to co-rotation with the levelling wheel about the displacement axis; and
    a top that covers the housing, and which, when installed, completely covers the levelling wheel, preventing rotation thereof.

2. The device of claim 1, further comprising:
    a stop, formed on the spindle between the external thread and the levelling wheel; and
    a counter-stop, formed on the housing, the counter-stop interposed between the stop and the levelling wheel.

3. The device of claim 1, wherein:
    the spindle is limited to a rotation about the displacement axis.

4. The device of claim 2, wherein:
    the stop supports the housing, through contact of the counterstop onto the stop.

5. The device of claim 1, wherein:
    a form fit between the foot piece and the recess prevents rotation of the foot piece about the displacement axis.

6. The device of claim 1, wherein:
    the snap connection works in the sense of a form-fitting connection.

7. The device of claim 1, wherein:
    the snap connection works in the sense of a bayonet connection.

8. The device of claim 1, wherein:
    the foot piece is accommodated entirely in the recess.

9. The device of claim 1, wherein:
    rotation of the levelling wheel about the displacement axis effects axial movement of the foot piece therealong.

10. The device of claim 1, further comprising:
    a connector peg, arranged between the levelling wheel and the spindle, having a flat area on a circumference thereof that joins the leveling wheel and the spindle in a rotation-blocking manner.

11. The device of claim 1, further comprising:
    a sole, attached to the surface of the foot piece and comprising a different material therefrom, the sole facing towards the surface on which the housing stands.

12. The device of claim 1, further comprising:
    at least one stop element attached to the surface of the foot piece that faces towards the stop on the spindle.

13. The device of claim 1, wherein:
    the levelling wheel is limited to a rotation about the displacement axis.

14. The device of claim 1, wherein:
    the device is at least one of: a balance, an automatic titrator, and an automatic moisture analyzer.

15. A base for providing a horizontal surface for an instrument-on an uneven standing surface, while protecting against inadvertent changes of an adjustment setting, the base comprising:
    a housing, adapted to receive the instrument;
    at least three adjustment devices for adjusting a relationship of the housing to the standing surface, each adjustment device comprising:
        a foot piece, arranged in a recess on a surface of the housing that faces the standing surface, the foot piece having an internal thread that defines a displacement axis, the foot piece further having a cross-sectional profile, perpendicular to the displacement axis, that coacts with the recess to prevent rotation of the foot piece about the displacement axis;
        a spindle with an external thread that cooperates with the internal thread of the foot piece; and
        a levelling wheel, connected to an end of the spindle, limiting the spindle to co-rotation with the levelling wheel about the displacement axis; and a top that that covers the housing, providing a base with a horizontal surface for the instrument, and which, when installed, completely covers the levelling wheel of each of the at least three adjustment devices, preventing rotation thereof.

16. The base of claim 15, wherein:
the instrument is at least one of: a balance, an automatic titrator, and an automatic moisture analyzer.

17. The base of claim 15, wherein:
rotation of the levelling wheel about the displacement axis effects axial movement of the foot piece therealong.

\* \* \* \* \*